(12) United States Patent
Bacthu et al.

(10) Patent No.: US 8,837,496 B2
(45) Date of Patent: Sep. 16, 2014

(54) IGMP QUERIER DOWN DETECTION USING PIM NEIGHBORSHIP CACHE

(75) Inventors: Natarja Bacthu, Sunnyvale, CA (US); Siddanagouda M. Khot, San Jose, CA (US); Raghava Sivaramu, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 13/473,648

(22) Filed: May 17, 2012

(65) Prior Publication Data

US 2013/0308636 A1    Nov. 21, 2013

(51) Int. Cl.
*H04L 12/28* (2006.01)

(52) U.S. Cl.
USPC ............................ 370/400; 370/342; 370/475

(58) Field of Classification Search
USPC ......... 370/390, 392, 393, 400, 401, 389, 402, 370/403, 404, 405, 406, 407, 408, 475
See application file for complete search history.

(56) References Cited

U.S. PATENT DOCUMENTS 6,331,983 B1 * 12/2001 Haggerty et al. ............. 370/400
7,769,885 B1 *  8/2010 Kompella ..................... 709/238

\* cited by examiner

*Primary Examiner* — Dady Chery
(74) *Attorney, Agent, or Firm* — Patterson + Sheridan, LLP

(57) ABSTRACT

In one embodiment, a method including identifying, by a network device, a first PIM-enabled device that is communicatively coupled to the network device via a network. A determination is made that the first PIM-enabled device is designated as an IGMP querier for the network. Additionally, the method includes initiating a timer configured to expire after a predetermined period of time for the first PIM-enabled device. The method further includes, upon determining that the initiated timer has expired and that a PIM hello network message has not yet been received from the first PIM-enabled device, determining that the IGMP querier for the network is unavailable.

21 Claims, 5 Drawing Sheets

IGMP QUERIER DOWN DETECTION USING PIM NEIGHBORSHIP CACHE

TECHNICAL FIELD

Embodiments presented in this disclosure generally relate to computer networking, and more particularly to techniques for Internet Group Management Protocol ("IGMP") querier election based on a Protocol Independent Multicast ("PIM") neighborship cache.

BACKGROUND

IGMP is a standard for Internet Protocol ("IP") multicasting. Generally, IGMP is used to establish host memberships, in particular multicast groups, on a single network. As part of the protocol, a host uses host membership reports to inform a local router acting as an IGMP querier that the host should receive messages addressed to a specific multicast group. That is, hosts on the network can subscribe to receive messages addressed to particular multicast groups. For instance, the IGMP querier could be configured to periodically broadcast IGMP query messages to various hosts on the network. And in response, individual hosts could transmit a report message indicating which types of messages a given host should receive.

When the IGMP querier receives a message addressed to a specific multicast group, the IGMP querier forwards the message to each of the subscribing hosts for the specified multicast group. Additionally, the IGMP protocol supports registration between IP-based computer terminals and IP-based routers or hosts that are directly attached to the same IP subnet. Additionally, such IP-based routers or hosts support multiple IP subnets concurrently.

Generally, IGMP snooping refers to techniques that enable a system to quietly inspect packets flowing through the system. IGMP snooping may also discretely detect IGMP packets of interest. For example, IGMP snooping allows a layer 2 switching device to passively capture IGMP protocol packets and use the information in these packets to selectively forward multicast data streams to one or more physical ports (and subsequently to computer devices). At the same time, switching devices may forward IGMP snooping packets to one or more physical ports, to convey its own multicast data stream forwarding requirements to other routers or layer 2 switching devices on other layer 2 physical segments. As such, an IGMP packet can extend beyond its original layer 2 physical segment.

PIM generally refers to a set of multicast routing protocols for IP networks. Generally, PIM protocols are used to provide one-to-many or many-to-many transmissions of data over a network. For instance, the Protocol Independent Multicast—Sparse Mode ("PIM-SM") protocol uses unicast routing protocols to construct a multicast tree rooted at a rendezvous point (e.g., a particular router within the network). Additionally, a PIM-equipped router may form neighborship with other PIM-equipped routers within the network and may maintain information related to this neighborship in a PIM neighborship cache. The PIM-equipped router can be configured to periodically transmit a message to each of the other PIM-equipped routers within the network. Additionally, the PIM-equipped router determine that a PIM-equipped router has become unavailable and accordingly remove that router from the neighborship cache, if the PIM-equipped router does not receive a response to the message from that PIM-equipped router within a particular interval of time.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION OF EXAMPLE EMBODIMENTS

Overview

Figure 1:
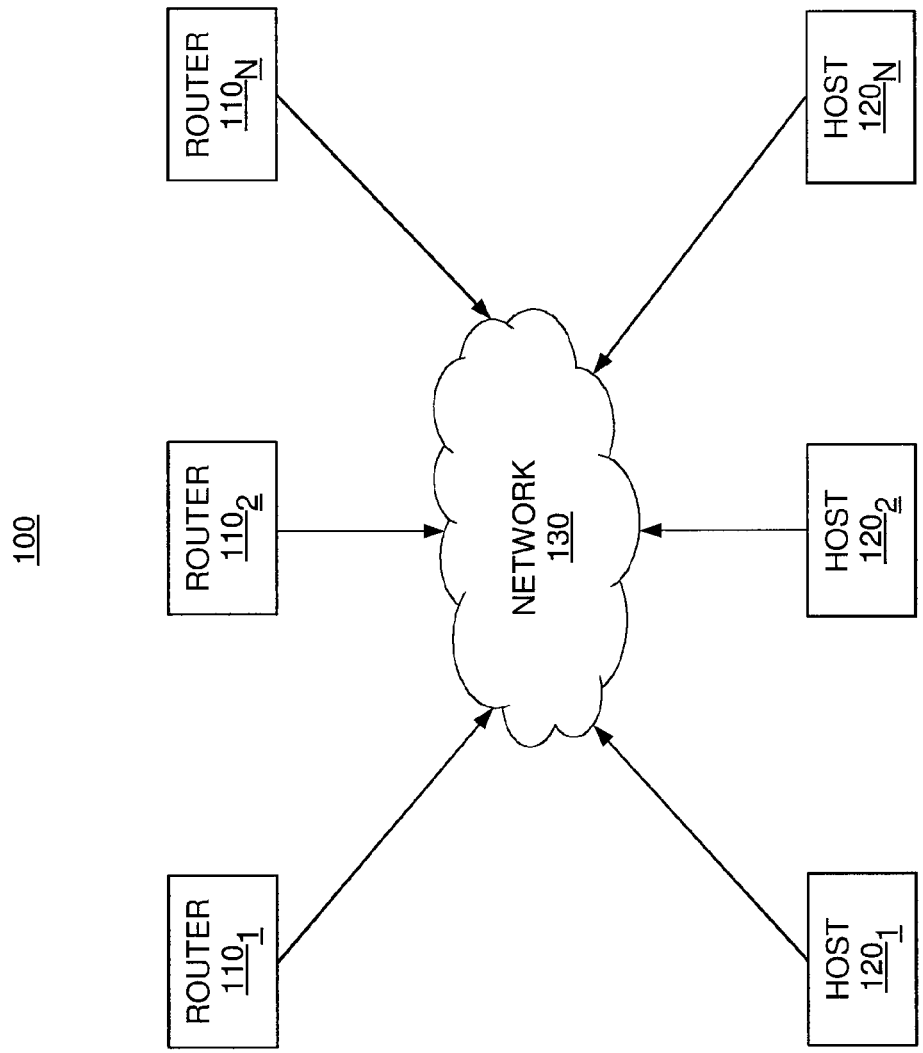
FIG. 1 is a diagram illustrating a network topology of a network environment, according to one embodiment described herein.

A method, system and computer program product that include determining, by a network device, that a first Protocol Independent Multicast (PIM)-enabled device is designated as an Internet Group Management Protocol (IGMP) querier for a network, wherein the first PIM-enabled device is coupled to the network device via the network. The method, system and computer program product also include initiating a timer configured to expire after a predetermined period for the first PIM-enabled device. Additionally, the method, system and computer program product include, upon determining that the timer has expired and determining that a PIM hello network message has not yet been received from the first PIM-enabled device, determining that the IGMP querier for the network has become unavailable.

Example Embodiments

As discussed above, the IGMP querier in an IGMP-configured network plays an important role in forwarding messages to the appropriate hosts within a network. Such forwarding may be performed, for instance, based on which messages and/or types of messages that each host subscribes to receive. For instance, the IGMP querier may periodically transmit a query message received by a set of hosts and, in response, each host could transmit a report message indicating which types of messages a given host wishes to receive. When the IGMP querier then receives a message addressed to a specific multicast group, the IGMP querier can forward the message to each of the hosts for the specified multicast group, based on the report messages received from the hosts.

Occasionally, the IGMP querier on an IGMP-configured network may fail or otherwise become unavailable. For example, the network device (e.g., a router) acting as the IGMP querier could experience a hardware failure. As another example, a network link connecting the IGMP querier to the network could fail. In such a situation, a new IGMP querier needs to be appointed for IGMP operations to continue.

For instance, the IGMP protocol provides a timeout interval for determining when the IGMP querier has become unavailable. Such a timeout interval is calculated based on a robustness variable ("RV"), query interval ("QI") and query response interval ("QRI") defined for the IGMP-configured network. More specifically, the timeout interval is defined as (RV*QI)+(QRI/2). As the IGMP protocol provides default values for the RV as 2, QI as 125 seconds and QRI as 10 seconds, the timeout interval for the IGMP querier using the default values is 255 seconds (i.e., (2*125)+(10/2)).

Additionally, the IGMP protocol defines an IGMP group membership timeout interval. Generally, this timeout interval determines when a particular host belonging to one or more of the multicast groups has become unavailable and thus should be removed from the group(s). The IGMP group membership timeout interval is defined as (RV*QI)+QRI. Thus, using the default values for RV, QI and QRI as defined by the IGMP protocol, the IGMP group membership timeout interval is 260 seconds (i.e., (2*125)+10).

If the IGMP querier does not respond within the IGMP querier timeout interval (e.g., 255 seconds), the IGMP-configured devices may determine that the IGMP querier has become unavailable. In such a situation, the IGMP-configured devices may initiate a process for selecting a new IGMP querier for the network. Once the new IGMP querier is selected, the new IGMP querier can transmit an IGMP query message to hosts on the network. In response, each host could transmit report messages indicating which type(s) of messages a given host wishes to subscribe and receive. The newly designated IGMP querier processes these report messages (e.g., to populate any data structures used in the routing of subsequent messages to various hosts) and then resumes the standard IGMP querier operations.

However, using the default timeout and other values provided by the IGMP protocol (as described above), the subscribing hosts are configured to expire if the hosts' IGMP report messages are not processed within the 260 second IGMP group membership timeout interval. Generally, the IGMP querier removes expired hosts from the relevant subscription groups, such that the expired hosts no longer receive messages the IGMP querier forwards to the relevant subscription groups. Further, under the default values an IGMP querier failure is not detected until the 255 second IGMP querier timeout interval has elapsed. As a result, this leaves only 5 seconds for the new IGMP querier to be appointed, for the new IGMP querier to receive report messages from all of the hosts, and for the new IGMP querier to process all of these report messages. While a 5 second interval may be sufficient in smaller-scale networks, it is often inadequate for larger-scale networks where the processing of the IGMP report messages from all of the hosts takes a substantial amount of time and processing power. As such, the IGMP group membership timeout interval may elapse for some hosts before a newly appointed IGMP querier can process each host's IGMP report message. As a result, an IGMP querier failure can lead to a service disruption for some hosts on the network, due to the limited amount of time (i.e., 5 seconds under the default values) between when the IGMP querier failure is detected and when the subscriptions of the various hosts timeout.

Furthermore, although the default values for RV, QI and QRI may be modified to help alleviate this problem, such a solution often comes at the cost of increased network traffic or responsiveness. For instance, the QI could be reduced to a smaller interval of time. However, doing so may lead to a substantial increase in network traffic on a network that includes a substantial number of hosts. Additionally, the QRI could be increased to allow for more time to elapse before a response to a general query message must be received, such a modification may not be supported by all devices (e.g., depending on which version of the IGMP protocol the devices implement). Additionally, increasing the QRI may increase the join latency and leave latency for hosts on the network (e.g., as the IGMP querier waits for a longer interval of time to elapse before determining a host has joined or left a subscription group).

Embodiments presented herein provide techniques for determining when an IGMP querier has become unavailable. For instance, embodiments could be implemented on a network device and identify a first PIM-enabled device coupled to the network device via a first network. Additionally, embodiments may determine that the first PIM-enabled device is designated as an IGMP querier for the first network. A timer configured to expire after a predetermined period of time may then be initiated for the first PIM-enabled device. Upon determining that the initiated timer has expired (and that a PIM hello network message has not yet been received from the first PIM-enabled device), it is determined that the IGMP querier for the first network is unavailable.

FIG. 1 shows an example of a network topology of a network environment according to one embodiment described herein. As shown, environment 100 includes a plurality of routers $110_{1-N}$ and a plurality of hosts $120_{1-N}$, connected via a network 130. In such an environment, one of the routers $110_{1-N}$ could be configured to act as the IGMP querier for devices on the network (e.g., hosts $120_{1-N}$). For example, router $110_1$ could be configured to act as the IGMP querier and could manage the routing of IGMP subscription messages to particular hosts $120_{1-N}$. For instance, the host $120_1$ and the host $120_N$ could each transmit an IGMP report message specifying a first message group containing messages that the hosts $120_{1,N}$ wish to receive. When the router $110_1$ (i.e., the IGMP querier) subsequently receives a message belonging to the first message group, the router $110_1$ could access its subscription data and determine that the hosts $120_{1,N}$ are subscribers to the first message group. The router $110_1$ could then transmit the subsequently received message to the host $120_{1,N}$.

In the event that the host $110_1$ becomes unavailable (e.g., the host $110_1$ experiences a hardware failure), a new IGMP querier for the network environment 100 may be appointed. As discussed above, although the IGMP protocol provides techniques for determining when the IGMP querier has become unavailable, such techniques have certain disadvantages. Most prominently, using the default values for RV, QI and QRI provided by the IGMP protocol, results in a time interval of 5 seconds for the new IGMP querier to be elected, receive reports from all the hosts $120_{1-N}$ and process these reports, before the IGMP group membership timeout interval elapses and the subscription groups maintained by the IGMP querier expire. Furthermore, while these default values can be modified in order to reduce these problems, such modifications may degrade other aspects of network performance, e.g., by increasing network traffic (e.g., due to an increased number and frequency of IGMP queries and reports) or host join or leave time (e.g., due to a longer QRI value).

Figure 2:
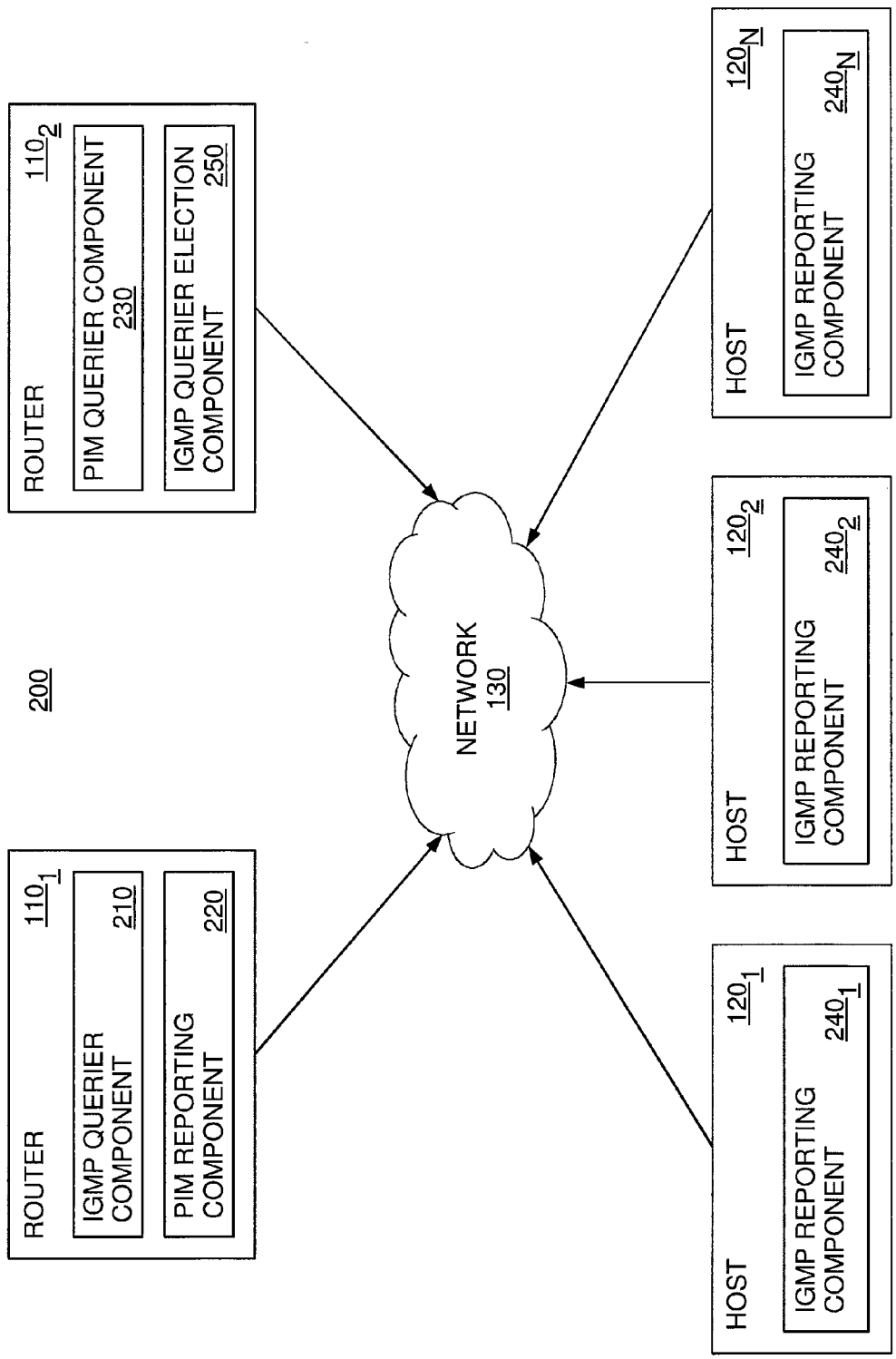
FIG. 2 is a diagram illustrating a network topology of a network configured with an IGMP querier election component, according to one embodiment described herein.

FIG. 2 illustrates a network topology of a network configured with an IGMP querier election component, according to one embodiment. As shown, a network 200 includes routers $110_{1,2}$ and a plurality of hosts $120_{1-N}$, interconnected via the network 130. The router $110_1$ includes an IGMP querier component 210 and a PIM reporting component 220. The IGMP querier component 210 is generally configured to perform the operations of an IGMP querier for devices (e.g., hosts $120_{1-N}$) in the network environment 200. For instance, the IGMP querier component 210 could be configured to periodically broadcast an IGMP query message to the hosts $120_{1-N}$, process IGMP report messages received from the hosts $120_{1-N}$ and to route messages corresponding to an IGMP subscription group to hosts $120_{1-N}$ that are subscribed to that IGMP subscription group. Additionally, the hosts $120_{1-N}$ each store an IGMP reporting component $240_{1-N}$. Each IGMP reporting component $240_{1-N}$ is generally configured to perform client-side IGMP operations for the hosts $120_{1-N}$. Such operations include, e.g., listening for the IGMP query message from the IGMP querier and, in response to receiving the IGMP query message, transmitting an IGMP report message specifying one or more subscription groups that the respective subscribes to receive.

As shown, the router $110_1$ also includes a PIM reporting component 220. The PIM reporting component 220 is generally configured to periodically generate a PIM hello network message, indicating that the router 1101 (i.e., a PIM-enabled interface) remains available. In this embodiment, a PIM querier component 230 monitors the status of the PIM-enabled devices on the network (e.g., router $110_1$). For instance, the PIM querier component 230 could be configured to determine whether a PIM-enabled interface is still available based on whether a PIM hello message has been received from the interface within a PIM hello interval ("PHI"). As an example, the PIM protocol defines a default PHI value of 30 seconds and a PIM neighbor expiry value of PHI*3.5 (i.e., 105 seconds under the default values). As such, if the PIM querier component 230 does not receive a PIM hello message from the PIM reporting component 220 within a time interval of 105 seconds (i.e., the default PIM neighbor expiration interval), the PIM querier component 230 determines that the PIM-enabled interface (i.e., the router $110_1$) is unavailable.

Of note, while the present example involves the default value for the PIM hello interval, the PIM hello interval can be reduced to detect when a PIM-enabled interface is unavailable more quickly. Additionally, because the PIM-enabled interfaces are typically routers on a network and because a network typically includes fewer routers than hosts, the PIM hello interval can be reduced more easily than the IGMP querier timeout interval without generating a substantial flood of network traffic.

The router $110_2$ further contains an IGMP querier election component 250. The IGMP querier election component 250 is generally configured to determine when the IGMP querier (i.e., router $110_1$ in the present example) has become unavailable, based on the IGMP querier's status in a PIM neighborship cache. For instance, the IGMP querier election component 250 could determine that the router $110_1$ is both the IGMP querier for the environment and a PIM-enabled device. The IGMP querier election component 250 could further monitor a PIM neighborship cache maintained by the PIM querier component 230 to determine when the router $110_1$ times out as a PIM neighbor. That is, the router $110_1$ may time out as a neighbor when the PIM querier component 230 fails to receive a PIM hello message from the PIM reporting component 220 on the router $110_1$ (e.g., because the router 1101 has failed, due to an interruption in the network 130, etc.).

Upon determining that the router $110_1$ has timed out as a PIM neighbor, the IGMP querier election component 250 could determine that the IGMP querier for the network environment 200 has failed. As a result, the IGMP querier election component 250 may initiate a PIM querier election process to elect a new IGMP querier for the network environment 200. For example, a network could be configured to select the IGMP-configured device with the lowest IP address as the new IGMP querier. In one embodiment, the IGMP querier election component 250 is configured to perform the IGMP querier selection process. For example, the IGMP querier election component 250 could determine that the IGMP querier (i.e., router $110_1$) has become unavailable and the IGMP querier election component 250 could itself assume the role of the IGMP querier component 210. As another example, the IGMP querier election component 250 could select another network device within the network environment 200 to assume the role of IGMP querier.

Advantageously, using PIM neighborhood cache, (along with techniques provided by the IGMP protocol for detecting when the IGMP querier has become unavailable) allows a network to determine that an IGMP querier has become unavailable more quickly, giving the system more time to elect a new IGMP queerer and process message subscriptions from hosts in large networks. That is, as discussed above, the IGMP querier timeout interval under the default values provided by the IGMP protocol is 255 seconds, while the PIM neighbor expiry interval is 105 seconds. As such, embodiments may determine that the IGMP querier has become unavailable 150 seconds faster than using the standard IGMP protocol (using the default values). Moreover, as discussed above, the PIM neighbor expiry interval frequently scales more efficiently than the IGMP querier timeout interval with respect to the amount of network traffic, as there are typically many more hosts than network devices within a network. As well as because the PIM protocol operates primarily between the network devices within the network while the IGMP protocol operates primarily between a network device and a plurality of hosts on the network. As such, because embodiments determine when the IGMP querier has become unavailable using the PIM neighborship cache, embodiments may make this determination more efficiently and more quickly when using non-default values (e.g., a shorter PIM hello interval).

Figure 3:
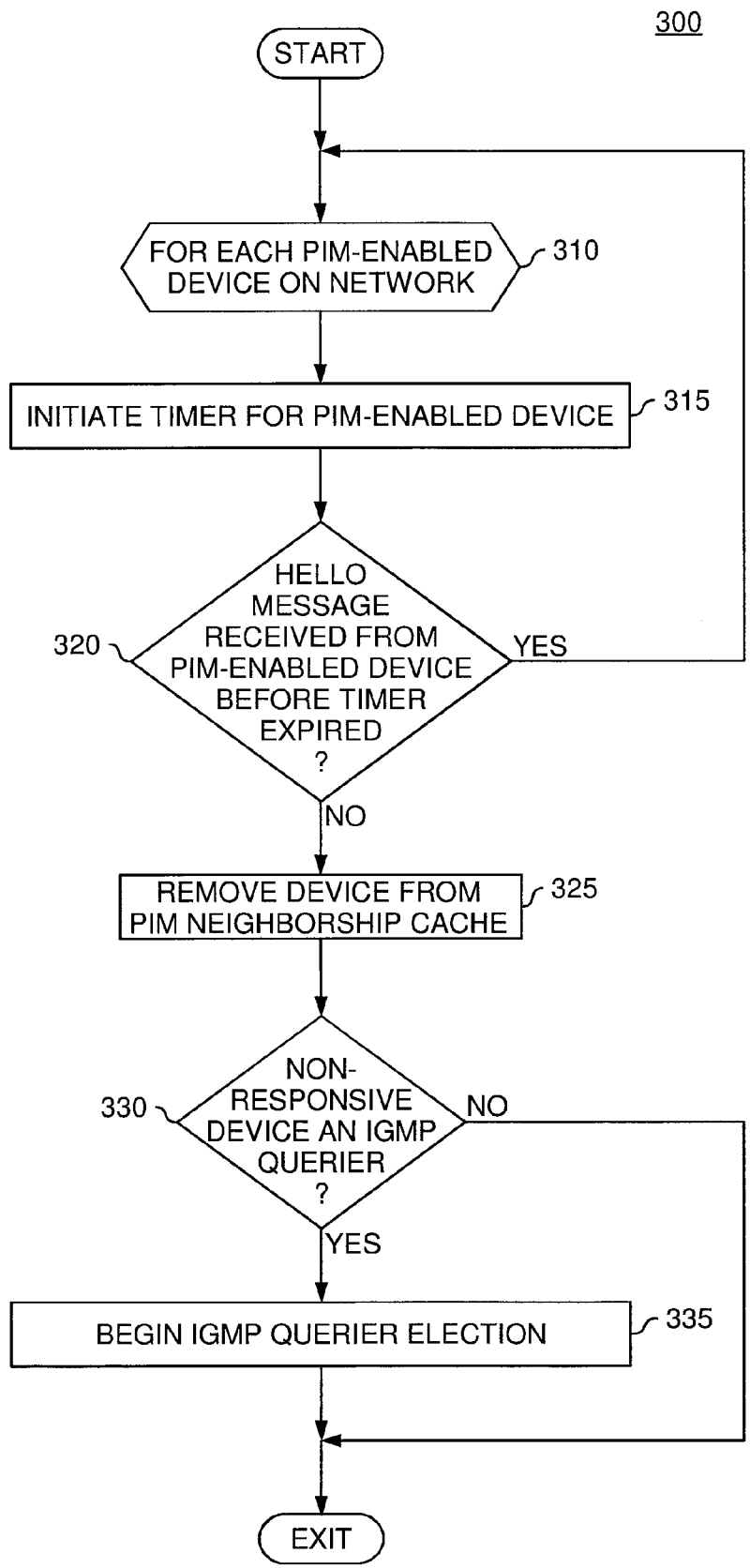
FIG. 3 is a flow diagram illustrating a method for initiating an IGMP querier election process, according to one embodiment described herein.

FIG. 3 is a flow diagram illustrating a method for initiating an IGMP querier election process, according to one embodiment described herein. As shown, the method 300 begins at block 310, where, for each PIM-enabled device on the network, the PIM querier component 230 initiates a timer (block 315). Here, the timer is set to expire after some predetermined period of time that corresponds to the PIM neighbor expiry interval (i.e., PHI*3.5). Thus, for example, using the default values for the PIM protocol, the timer could be set to expire after 105 seconds (i.e., 30 seconds*3.5).

The PIM querier component 230 then determines whether a PIM hello message was received from the PIM-enabled device before the expiration of the corresponding timer (block 320). If so, then at block 310, the PIM querier component 230 initiates a timer at the next interval for the network device. Otherwise, (if the timer expired before a PIM hello message was received), the PIM querier component 230 removes the PIM-enabled device from the list of active PIM neighbors in the PIM neighborship cache (block 325).

Additionally, the IGMP querier election component 250 determines whether the non-responsive device is the IGMP querier for the network (block 330). Of note, although the determination whether the unresponsive device is the IGMP querier is depicted as occurring after no hello network messages were received from the device during the PIM neighbor expiry interval, this depiction is for illustrative purposes only. More generally, determining which device is acting as the IGMP querier for the network can occur at any point in time consistent with the functionality described herein. For example, the IGMP querier election component 250 could have previously determined which device on the network is acting as the IGMP querier by monitoring and processing IGMP traffic flowing through the network (e.g., IGMP query messages).

In any event, if the IGMP querier election component 250 determines that the non-responsive device is the IGMP querier, the IGMP querier election component 250 initiates an IGMP querier election process for the network to select new IGMP querier (block 335). For example, the network could be configured to select the IGMP-enabled device having the lowest IP address will as the IGMP querier. In this configuration, when the IGMP-enabled device having the lowest IP address (i.e., the current IGMP querier) becomes unavailable, the IGMP-enabled device having the second lowest IP address may assume the role of the IGMP querier. If instead the IGMP querier election component 250 determines that the unresponsive device is not the IGMP querier for the network, or once the IGMP querier election component 250 initiates the IGMP querier election process, the method 300 ends.

Advantageously, embodiments are able to detect when the IGMP querier has become unavailable more quickly, relative to the approach provided by the IGMP protocol. That is, using the default values for both PIM and IGMP, embodiments could detect when the IGMP querier has become unavailable within 105 seconds, while it would take 255 seconds to detect the IGMP querier has become unavailable using the techniques provided by the IGMP protocol. Moreover, because the PIM protocol can frequent scale its hello message interval more efficiently with respect to network traffic than the IGMP protocol can scale its query interval, embodiments may use the PIM neighborship cache to detect when the IGMP querier has become unavailable even more quickly and more efficiently when using non-default values (e.g., a shorter PIM hello interval). Moreover, detecting that the IGMP querier has become unavailable more quickly results in a larger window of time for electing a new IGMP querier, receiving IGMP report messages from hosts on the network and processing such report messages. This may be particularly advantageous, for instance, in large scale networks that include a substantial number of hosts, as it may take a substantial amount of time for the newly appointed IGMP querier to process report messages from all of the hosts.

Figure 4:
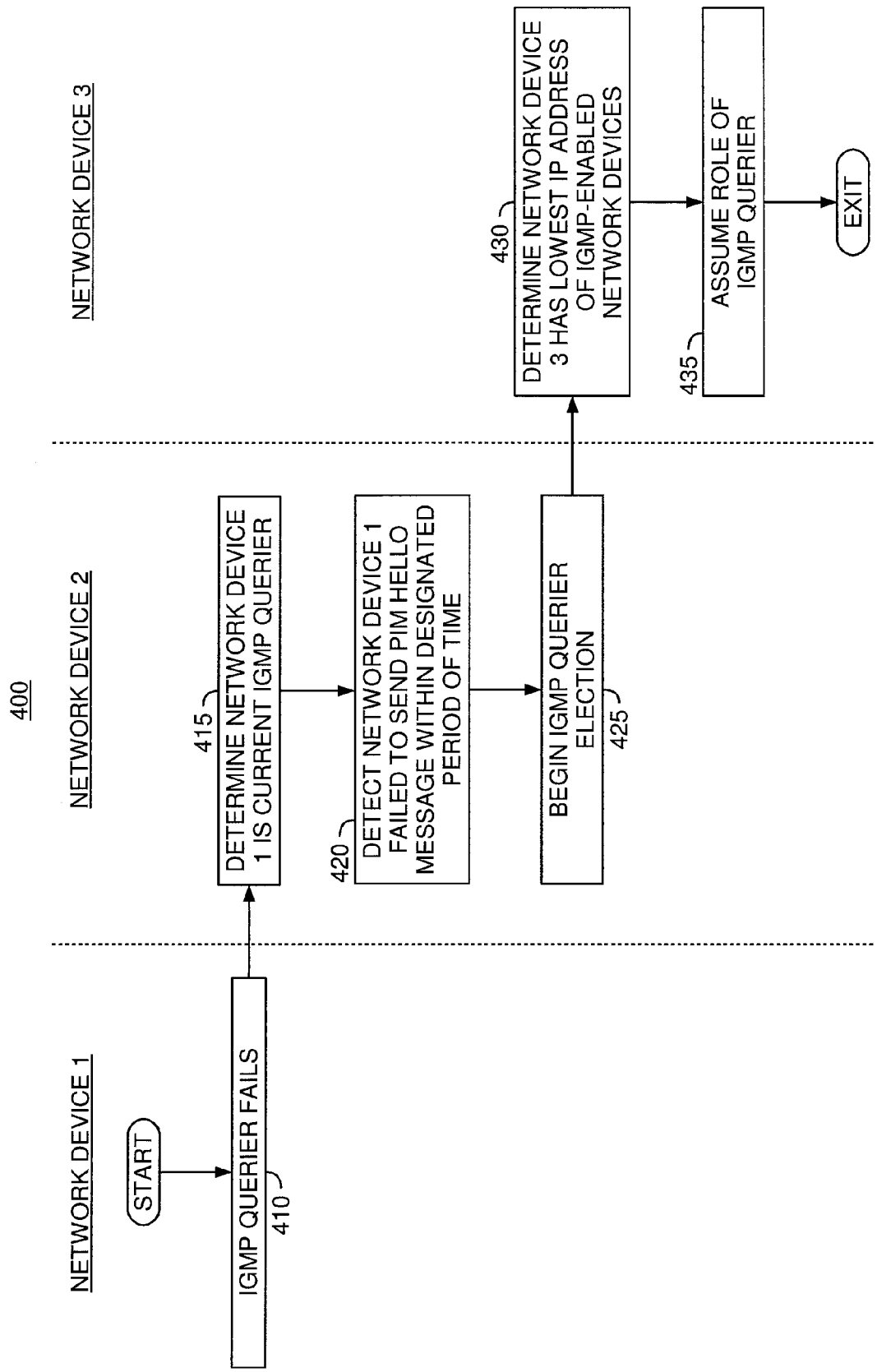
FIG. 4 is a flow diagram illustrating a method for performing an IGMP querier election process, according to one embodiment described herein.

FIG. 4 is a flow diagram illustrating a method for performing an IGMP querier election process, according to one embodiment. As shown, the method 400 begins at block 410, where the IGMP querier (i.e., network device 1 in the depicted example) on a network fails. As discussed above, a variety of circumstance, e.g., hardware failure, software failure, and cables becoming unplugged or dislodged can result in an IGMP querier becoming isolated from the network or otherwise unavailable.

At block 415, the IGMP querier election component 250 on the network device 2 determines that the network device 1 is the current IGMP querier for the network. Such a determination could be made, for instance, based on monitored IGMP traffic transiting (or visible) to network device 1. In one embodiment, the IGMP querier election component 250 is configured to designate the available IGMP-enabled network device having the lowest IP address as the current IGMP querier. During otherwise normal operations, the IGMP querier election component 250 on network device 2 detects that the IGMP querier (i.e., network device 1) failed to send a PIM hello message within the designated interval (block 420). For example, the IGMP querier election component 250 could monitor a PIM neighborship cache maintained by a PIM querier component on the network device 2 in order to determine when the IGMP querier (i.e., network device 1) has become unavailable (i.e., when a PIM hello message is not received from the network device 1 within the required interval of time).

After determining the IGMP querier is unavailable, the IGMP querier election component 250 initiates an IGMP querier election process to appoint a new IGMP querier for the network (block 425). For purposes of this example, assume that the IGMP-enabled device on the network having the lowest IP address will assume the role of the IGMP querier. Further, for purposes of this example, assume that network device 3 is the IGMP-enabled device having the lowest IP address after the network device 1 has become unavailable.

As such, an IGMP querier component on the network device 3 determines that the network device 3 has the lowest IP address of the available IGMP-enabled devices (block 430). That is, while the network device 3 may have originally had the second lowest IP address of all the IGMP-enabled devices on the network, it has the lowest IP address of the IGMP-enabled devices once network device 1 becomes unavailable. As such, the IGMP querier component on the network device 3 assumes the role of the new IGMP querier for the network (block 435), and the method 400 ends. For example, the IGMP querier component could transmit an IGMP query message to the various hosts on the network, receive IGMP report message(s) from each of the various hosts and process these report messages to determine which subscription group(s) each host belongs to. The IGMP querier component on the network device 3 could then forward subsequently received messages to the corresponding hosts, based on the determined subscription group information. Advantageously, by using the method 400, the newly appointed IGMP querier component on the network device 3 can more quickly assume the role of IGMP querier, as the unavailability of the original IGMP querier (i.e., network device 1) is detected more quickly through the use of the PIM neighborship cache.

Figure 5:
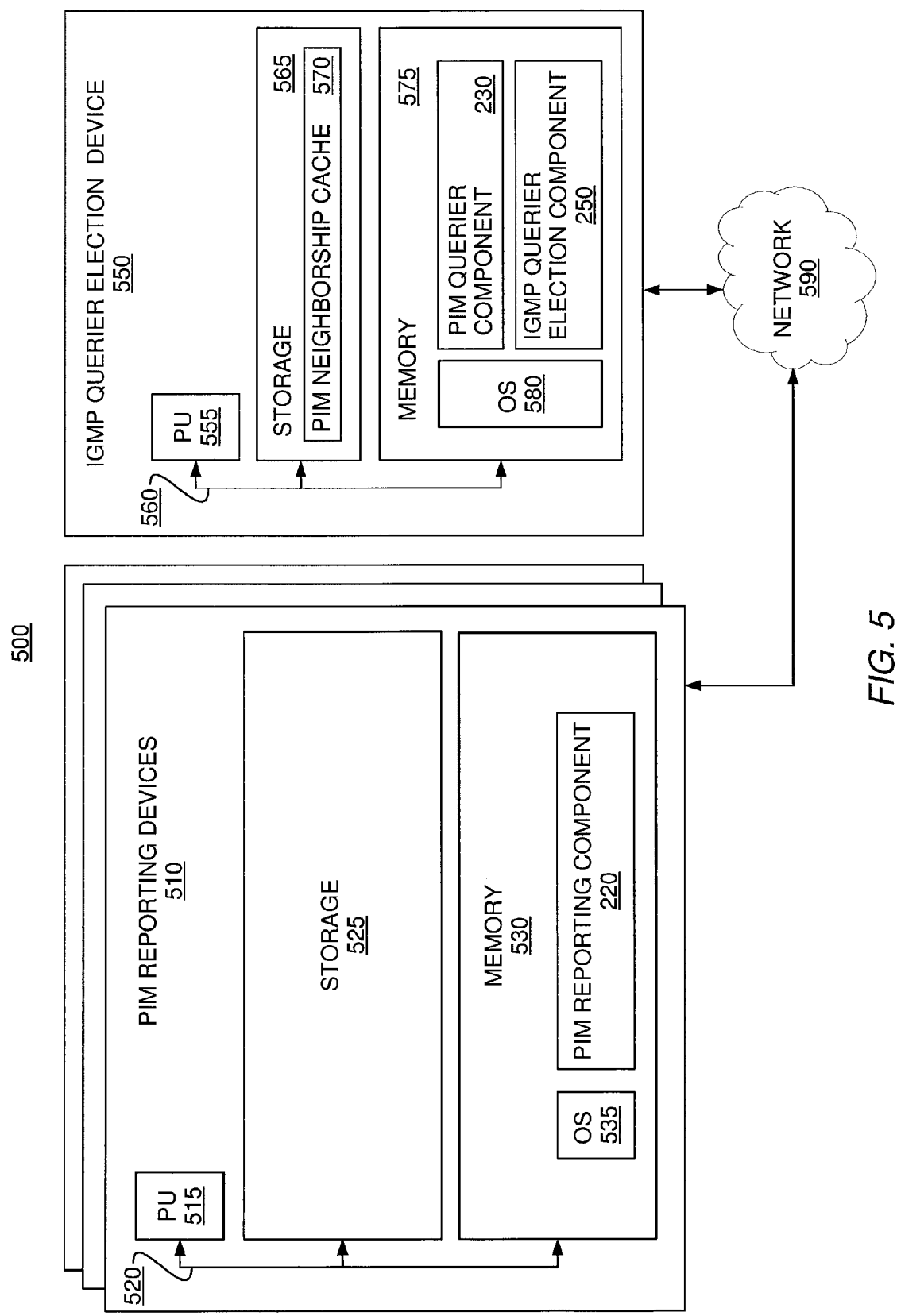
FIG. 5 is a block diagram illustrating a system configured with an IGMP querier election component, according to one embodiment described herein.

FIG. 5 is a block diagram illustrating a system configured with an IGMP querier election component, according to one embodiment described herein. As shown, network environment 500 includes PIM reporting devices 510, a network 590 and an IGMP querier election device 550. According to one embodiment, the PIM reporting devices 510 and the IGMP querier election devices 550 represent network devices (e.g., routers) that are communicatively coupled together via the network 590. In one embodiment, the environment 500 may include existing computer systems, e.g., desktop computers, server computers, laptop computers, tablet computers, gaming consoles, hand-held gaming devices and the like. The network environment 500 illustrated in FIG. 5, however, is merely an example of one network environment in which embodiments may be used. Embodiments may be implemented differently, regardless of whether the computer systems are complex multi-user computing systems, such as a cluster of individual computers connected by a high-speed network, single-user workstations or network appliances lacking non-volatile storage.

As shown, each PIM reporting device 510 includes a processing unit 515, which obtains instructions and data via a bus 520 from a memory 530 and storage 525. Processing unit 515 is a programmable logic device that performs instruction, logic and mathematical processing, and may be representative of one or more CPUs. Storage 525 stores application programs and data for use by network device 610. The memory 530 is any memory sufficiently large to hold the necessary programs and data structures. Memory 530 could be one or a combination of memory devices, including Random Access Memory, nonvolatile or backup memory (e.g., programmable or Flash memories, read-only memories, etc.). In addition, memory 530 and storage 525 may be considered to include memory physically located elsewhere; for example, on another computer coupled to the PIM reporting device 510 via bus 520.

Examples of storage 525 include, without limitation, hard-disk drives, flash memory devices, optical media and the like. Each PIM reporting device 510 is operably connected to the network 590. Memory 530 includes an operating system ("OS") 535 and a PIM reporting component 220. Generally, the PIM reporting components 220 on the PIM reporting devices 510 are configured to transmit PIM hello messages to the PIIM querier component 230 on the IGMP querier election device 550. Operating system 535 is the software used for managing the operation of the PIM reporting device 510. Examples of OS 535 include UNIX, a version of the Microsoft Windows® operating system, and distributions of the Linux® operating system. (Note: Linux is a trademark of Linus Torvalds in the United States and other countries.) Additionally, OS 535 may be an operating system specially developed for network devices, such as Cisco IOS®.

As shown, the IGMP querier election device 550 includes the same basic hardware elements as the PIM reporting devices 510. However, such a depiction is without limitation and is instead provided for illustrative purposes only. In the depicted embodiment, the IGMP querier election device 550 includes a processing unit 555 (representative of one or more CPUs and/or GPUs), a memory 575 and storage 565 connected via a bus 560. The IGMP querier election device 650 may be operably connected to the network 590, which generally represents any kind of data communications network. Accordingly, the network 590 may represent both local and wide area networks, including the Internet.

The storage 565 contains PIM neighborship cache data 570. As discussed above, the PIM neighborship cache data 570 may generally contain information on the status of PIM neighbor devices. The memory 575 contains an OS 580, a PIM querier component 230 and an IGMP querier election component 250. OS 580 is the software used for managing the operation of the IGMP querier election device 550. Examples of OS 580 include UNIX, a version of the Microsoft Windows® operating system, and distributions of the Linux® operating system. Additionally, OS 580 may be an operating system specially developed for network devices, such as Cisco IOS®.

The PIM querier component 230 is generally configured to receive PIM hello messages from the PIM reporting components 220 on the PIM reporting devices 510 and to update the PIM neighborship cache 570 based on these hello messages. The PIM querier component 230 may also update the PIM neighborship cache 570 based on the lack of a PIM hello message from one of the PIM reporting components 220 on one of the PIM reporting devices 510. For instance, the PIM querier component 230 could initiate a timer set to expire after a PIM neighbor expiry interval of time (e.g., 105 seconds using default values). If the PIM querier component 230 does not receive a PIM hello message from one of the PIM reporting components 220 before the timer expires, the PIM querier component 230 could designate the nonresponsive PIM reporting component 220 as unavailable in the PIM neighborship cache 570.

As discussed above, the IGMP querier election component 250 can determine which of the PIM reporting devices 510 is acting as the current IGMP querier for the network environment 500. The IGMP querier election component 250 could then monitor the PIM neighborship cache 570 in order to determine when the IGMP querier becomes unavailable. Upon determining that the IGMP querier is unavailable, the IGMP querier election component 250 could initiate an IGMP querier election process in order to appoint a new IGMP querier for the network environment 500. For example, such an election process could include each IGMP-enabled network device on the network transmitting an IGMP query message, and each IGMP-enabled network device could listen to the query messages received from the other network devices. Upon a first one of the network devices determining that no other IGMP-enabled device transmitting a query message has a lower IP address than the first device, the first device could assume the role of the IGMP querier for the network. Advantageously, by using the PIM neighborship cache 570 to detect the unavailability of the IGMP querier, embodiments can elect a new IGMP querier more quickly and efficiently than by traditional means.

Additionally, it is specifically contemplated that embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Cloud computing resources may be provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of the present disclosure, an IGMP querier election component 250 could execute on a network device (e.g., a router) in the cloud and could monitor a PIM neighborship cache in order to determine when the IGMP querier for a network becomes unavailable. In such a case, the IGMP querier election component 250 could initiate an IGMP querier election process upon determining that the IGMP querier has become unavailable. Doing so helps to ensure that users can access host applications running in the cloud from any computing system attached to a network connected to the cloud (e.g., the Internet) without experiencing service interruptions due to IGMP querier failure.

As an additional example, the individual ticketing systems used by each of the parties could be deployed onto various computing systems within the cloud together with the service request processing component 300. Doing so may enable the ticketing systems to more quickly pass requests and information to one another via the service request processing component 300. Furthermore, the cloud could be maintained by one of the parties (e.g., the vendor), who could provide access to the various other parties (e.g., partners and customers) as part of the service agreement.

As will be appreciated by one skilled in the art, embodiments may be embodied as a system, method or computer program product. Accordingly, aspects may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to particular embodiments, other and further embodiments may be devised without departing from the basic scope thereof. In view of the foregoing, the scope of the present disclosure is determined by the claims that follow.

We claim:

1. A method, comprising:
   determining, by a network device, that a first Protocol Independent Multicast (PIM)-enabled device is designated as an Internet Group Management Protocol (IGMP) querier for a network, wherein the first PIM-enabled device is coupled to the network device via the network;
   initiating a timer configured to expire after a predetermined period for the first PIM-enabled device; and
   upon determining, by operation of one or more computer processors on the network device, that the timer has expired and determining that a PIM hello network message has not yet been received from the first PIM-enabled device, determining that the IGMP querier for the network has become unavailable.

2. The method of claim 1, further comprising:
   upon determining that the IGMP querier for the network has become unavailable, selecting a second device on network to assume the role of IGMP querier.

3. The method of claim 2, wherein the first PIM-enabled device has a lowest IP address of all PIM-enabled devices on the network, and wherein the second device is selected based on the second device having the second lowest IP address of all the PIM-enabled devices on the network.

4. The method of claim 2, further comprising:
   wherein the second device is configured to, upon the second device assuming the role of IGMP querier:
     transmit an IGMP query message to a plurality of hosts on the network;
     receive, from at least one of the plurality of hosts, an IGMP report message specifying one or more subscription groups that the respective host wishes to join; and
     process the received at least one IGMP report message in order to generate subscription data, wherein the subscription data is used for the routing of subsequently received messages to one or more of the hosts.

5. The method of claim 1, further comprising:
   identifying, by the network device, one or more other PIM-enabled devices that are communicatively coupled to the network device via the network;
   initiating a respective timer configured to expire after a predetermined period of time for each of the identified one or more other PIM-enabled devices; and
   for each of the initiated timers:
     upon determining that a respective PIM hello network message has not yet been received from the corresponding PIM-enabled device, determining that the corresponding PIM-enabled device is unavailable.

6. The method of claim 1, further comprising:
   upon receiving the PIM hello network message from the first PIM-enabled device before the initiated timer expires, determining that the IGMP querier for the network is still available.

7. The method of claim 1, further comprising:
   upon determining that the IGMP querier for the network is unavailable, initiating a selection process on the network for selecting a second device to assume the role of IGMP querier for the network.

8. A system, comprising:
   a processor; and
   a memory containing a program that, when executed by the processor, performs an operation for:
     determining that a first Protocol Independent Multicast (PIM)-enabled device is designated as an Internet Group Management Protocol (IGMP) querier for a network, wherein the first PIM-enabled device is coupled to the system via the network;
     initiating a timer configured to expire after a predetermined period for the first PIM-enabled device; and
     upon determining that the timer has expired and determining that a PIM hello network message has not yet been received from the first PIM-enabled device, determining that the IGMP querier for the network has become unavailable.

9. The system of claim 8, the operation further comprising:
   upon determining that the IGMP querier for the network has become unavailable, selecting a second device on network to assume the role of IGMP querier.

10. The system of claim 9, wherein the first PIM-enabled device has a lowest IP address of all PIM-enabled devices on the network, and wherein the second device is selected based on the second device having the second lowest IP address of all the PIM-enabled devices on the network.

11. The system of claim 9, the operation further comprising:
wherein the second device is configured to, upon the second device assuming the role of IGMP querier:
transmit an IGMP query message to a plurality of hosts on the network;
receive, from at least one of the plurality of hosts, an IGMP report message specifying one or more subscription groups that the respective host wishes to join; and
process the received at least one IGMP report message in order to generate subscription data, wherein the subscription data is used for the routing of subsequently received messages to one or more of the hosts.

12. The system of claim 8, the operation further comprising:
identifying one or more other PIM-enabled devices that are communicatively coupled to the system via the network;
initiating a respective timer configured to expire after a predetermined period of time for each of the identified one or more other PIM-enabled devices; and
for each of the initiated timers:
upon determining that a respective PIM hello network message has not yet been received from the corresponding PIM-enabled device, determining that the corresponding PIM-enabled device is unavailable.

13. The system of claim 8, the operation further comprising:
upon receiving the PIM hello network message from the first PIM-enabled device before the initiated timer expires, determining that the IGMP querier for the network is still available.

14. The system of claim 8, the operation further comprising:
upon determining that the IGMP querier for the network is unavailable, initiating a selection process on the network for selecting a second device to assume the role of IGMP querier for the network.

15. A computer program product, comprising:
computer code that determines, at a network device, that a first Protocol Independent Multicast (PIM)-enabled device is designated as an Internet Group Management Protocol (IGMP) querier for a network, wherein the first PIM-enabled device is coupled to the network device via the network;
computer code that initiates a timer configured to expire after a predetermined period for the first PIM-enabled device;
computer code that, upon determining that the timer has expired and determining that a PIM hello network message has not yet been received from the first PIM-enabled device, determines that the IGMP querier for the network has become unavailable; and
a non-transitory computer-readable medium that stores the computer codes.

16. The computer program product of claim 15, further comprising:
computer code that, upon determining that the IGMP querier for the network has become unavailable, selects a second device on network to assume the role of IGMP querier.

17. The computer program product of claim 16, wherein the first PIM-enabled device has a lowest IP address of all PIM-enabled devices on the network, and wherein the second device is selected based on the second device having the second lowest IP address of all the PIM-enabled devices on the network.

18. The computer program product of claim 16, further comprising:
wherein the second device is configured to, upon the second device assuming the role of IGMP querier:
transmit an IGMP query message to a plurality of hosts on the network;
receive, from at least one of the plurality of hosts, an IGMP report message specifying one or more subscription groups that the respective host wishes to join; and
process the received at least one IGMP report message in order to generate subscription data, wherein the subscription data is used for the routing of subsequently received messages to one or more of the hosts.

19. The computer program product of claim 15, further comprising:
computer code that identifies one or more other PIM-enabled devices that are communicatively coupled to the network device via the network;
computer code that initiates a respective timer configured to expire after a predetermined period of time for each of the identified one or more other PIM-enabled devices; and
computer code that, for each of the initiated timers:
upon determining that a respective PIM hello network message has not yet been received from the corresponding PIM-enabled device, determines that the corresponding PIM-enabled device is unavailable.

20. The computer program product of claim 15, further comprising:
computer code that, upon receiving the PIM hello network message from the first PIM-enabled device before the initiated timer expires, determines that the IGMP querier for the network is still available.

21. The computer program product of claim 15, further comprising:
computer code that, upon determining that the IGMP querier for the network is unavailable, initiates a selection process on the network for selecting a second device to assume the role of IGMP querier for the network.

* * * * *